US007505884B2

United States Patent
Dadkhah et al.

(10) Patent No.: US 7,505,884 B2
(45) Date of Patent: Mar. 17, 2009

(54) METHOD FOR AUTOMATIC GENERATION OF FINITE ELEMENT MESH FROM IC LAYOUT DATA

(75) Inventors: Fereydoon Dadkhah, Fishers, IN (US); John M. Dikeman, Kokomo, IN (US); Gregory M. Hutchinson, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 406 days.

(21) Appl. No.: 11/399,893

(22) Filed: Apr. 7, 2006

(65) Prior Publication Data

US 2007/0239419 A1    Oct. 11, 2007

(51) Int. Cl.
*G06F 17/50* (2006.01)
*G06F 15/00* (2006.01)

(52) U.S. Cl. .............................. 703/2; 703/17; 702/136; 716/9; 716/20

(58) Field of Classification Search ................ 703/2, 703/6, 17; 716/9, 10, 20; 702/136
See application file for complete search history.

(56) References Cited

U.S. PATENT DOCUMENTS

| 5,294,831 | A | * | 3/1994 | Azar et al. ................... 257/722 |
| 5,550,750 | A | * | 8/1996 | Wolff ........................... 716/10 |
| 5,675,521 | A | * | 10/1997 | Holzhauer et al. ............ 716/20 |
| 6,621,055 | B2 | * | 9/2003 | Weber et al. ................. 219/494 |
| 6,895,354 | B2 | | 5/2005 | Matsuyama et al. |
| 2002/0040466 | A1 | * | 4/2002 | Khazei ........................... 716/9 |

* cited by examiner

*Primary Examiner*—Thai Phan
(74) *Attorney, Agent, or Firm*—Jimmy L. Funke

(57) ABSTRACT

The present invention includes a method for performing a thermal analysis, including the steps of determining size and placement of each of a plurality of drivers on an integrated circuit device. The determined size and placement of each driver is stored as layout data and the layout data is converted into input for a finite element analysis program. The input is applied to the finite element analysis program, and the finite element analysis program is used to construct a finite element mesh of the integrated circuit device from the input. Additionally, material properties are assigned to the finite element mesh, and a thermal analysis is performed of the finite element mesh to generate data in a thermal analysis report.

19 Claims, 3 Drawing Sheets

METHOD FOR AUTOMATIC GENERATION OF FINITE ELEMENT MESH FROM IC LAYOUT DATA

TECHNICAL FIELD

The present invention relates to performing a thermal analysis on integrated circuit devices and the like, and in particular, to an automated thermal analysis program that requires little or minimal user interaction.

BACKGROUND OF THE INVENTION

When designing integrated circuits, electronics engineers typically determine the size and placement of drivers based on design requirements and using various integrated circuit layout tools. When a proposed layout design is complete, a thermal analysis is conducted of the integrated circuit device to ensure that the driver locations have been properly specified. Typically, the thermal analysis is performed by using a finite element analysis program. The finite element analysis indicates whether the amount of power dissipated in the integrated circuitry, or the size or location of the drivers, can potentially lead to thermal overload of the integrated circuitry.

In order to conduct a finite element analysis, the final integrated circuit layout is used to construct a three-dimensional model of the integrated circuit. For this to occur, a data exchange must take place between the integrated circuit design tools and the finite element analysis tools. The data exchange is typically cumbersome and can be very time-consuming. Specifically, an analyst must define the areas on the surface of the die that have individual drivers and input that information into the finite element analysis tool. The analyst may complete this process using one of two conventional methods. The analyst can either manually enter the information or enter the information by reading an intermediate format file such as an Initial Graphics Exchange Specification (IGES) file. When the information is entered manually, a large number of coordinate pairs describing the driver boundaries are typed into the finite element analysis tool. Accordingly, the likelihood of typing an inaccurate number in a coordinate pair is relatively high. The second method, reading an intermediate format file, generally includes spending a considerable amount of time cleaning up the intermediate format file data so that the finite element analysis tools can read the data.

After the layout data has been successfully imported into the finite element analysis tool, a three-dimensional mesh is generated. The three-dimensional mesh is generated before the thermal analysis is performed. Oftentimes, before an integrated circuit is constructed, changes in customer requirements or other fabrication modifications can lead to changes in the integrated circuit layout. Consequently, it is important for this process to be completed in a timely and efficient manner with minimal likelihood of error so that designers, as well as customers, are aware of the effect of modifications requested during fabrication.

Accordingly, a method of conducting a finite element analysis that minimizes the likelihood of human error and can be completed in relatively minimal time would prove useful, and would be an improvement in the art.

SUMMARY OF THE INVENTION

One aspect of the present invention is a method of performing thermal analysis of an integrated circuit device. Initially, integrated circuit device layout data is read and parsed by a parsing portion of a data conversion program. The data conversion program also instructs a finite element analysis program to generate predetermined thermal source areas based on the integrated circuit layout data. The data conversion program instructs the finite element analysis program to partition the integrated surface area into thermal source areas by performing Boolean operations. Further, the conversion program instructs the finite element analysis program to generate a finite element mesh of the integrated circuit device. Information about operating conditions is then collected from a user and the conversion program instructs the finite element analysis program to perform a thermal analysis of the integrated circuit device based on the information collected about operating conditions. The finite element analysis program is then executed. Thermal analysis data is produced from the results developed during execution of the finite element analysis program based on the operating conditions supplied by the user.

Another aspect of the present invention is a method of performing a thermal analysis comprising the steps of determining size and placement of each of a plurality of drivers on an integrated circuit device. The determined size and placement of each driver is stored as layout data and the layout data is converted into input for a finite element analysis program. The input is applied to the finite element analysis program, and the finite element analysis program constructs a finite element mesh of the integrated circuit device. Additionally, material properties are assigned to the finite element mesh, and a thermal analysis of the finite element mesh is performed to generate report data on the thermal characteristics of the integrated circuit.

Yet another aspect of the present invention is an integrated thermal analysis system that includes a layout tool that generates integrated circuit layout data from an integrated circuit device. A conversion program converts the integrated circuit device layout data into finite analysis input data, and a finite element analysis program creates a two-dimensional representation of a surface area of the integrated circuit device and further creates a three-dimensional finite element mesh from the surface area. In addition, a graphical user interface is incorporated to accept material property data entered by a user, and the thermal analysis data is assigned to the three-dimensional finite element mesh to generate data on the thermal characteristics of the integrated circuit device.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 2:
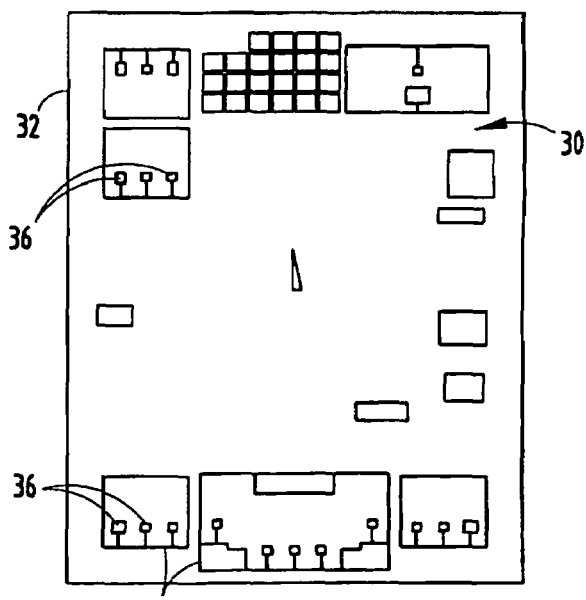
FIG. 2 is a top view of an IC layout.

For purposes of description herein the terms "upper," "lower," "right," "left," "rear," "front," "vertical," "horizontal" and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
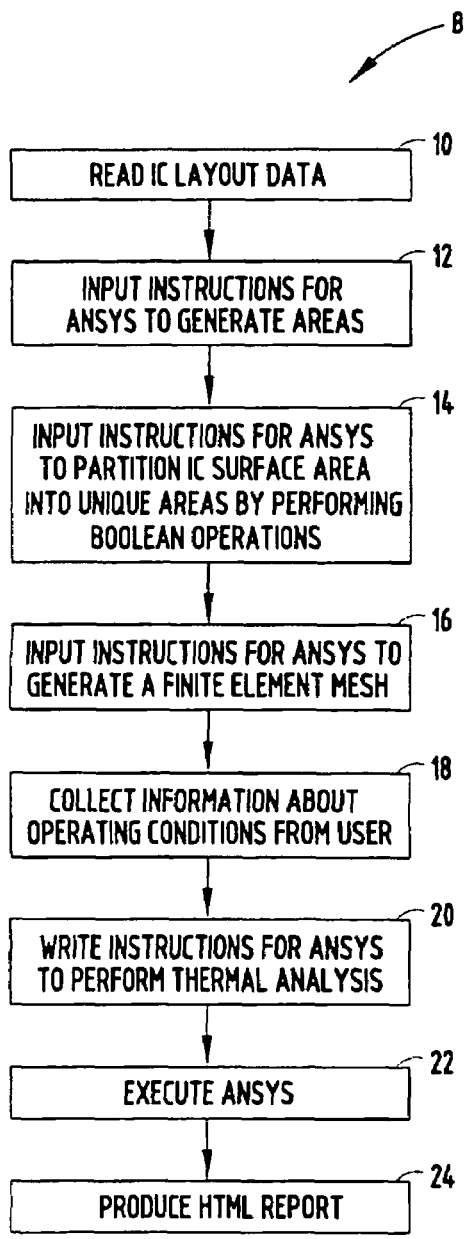
FIG. 1 is a flow chart diagram illustrating a method of generating integrated circuit (IC) thermal analysis according to one embodiment of the present invention.

Referring to FIG. 1, the reference numeral 8 generally designates a method for conducting an integrated circuit thermal analysis of an integrated circuit (IC) device 9 (shown in FIG. 2), according to an exemplary embodiment. Method 8 may be implemented automatically by processing software in a microprocessor. Method 8 generates thermal analysis data of the IC device 9 in the form of a report. The thermal analysis data may be used in determining the viability of particular driver orientations on the IC device 9, while minimizing manual user interaction.

Initially, method 8 begins when IC layout data of an IC device is read and parsed in step 10 by a parsing portion of a conversion program. The conversion program may employ a known analysis program such as ANSYS, commercially available from ANSYS, Inc. for creating a thermal simulation of the IC device 9. Next, in step 12, the conversion program instructs a finite element analysis (FEA) program to generate predetermined thermal source areas based on the IC layout data of the IC device 9. In step 14, the conversion program instructs the finite element analysis program to partition the IC device area into thermal source areas by performing Boolean operations. Further, in step 16, the conversion program instructs the FEA program to generate a finite element mesh of the IC device 9. The finite element mesh defines a three dimensional model of the IC device 9 with identical driver placement and notch area placement. Information is then collected in step 18 from a user about operating conditions, and, in step 20, the conversion program instructs the FEA program to perform the thermal analysis based on the information collected from the user. The FEA program is executed in step 22 to generate thermal analysis data. A thermal analysis report containing the thermal analysis data is produced that provides the relevant thermal characteristics of the IC device 9 in step 24 based upon the operating conditions supplied by the user.

FIG. 2 shows the layout 30 of a typical IC device 9 having an IC surface area 32, driver areas 34, and notch areas 36 formed on the surface of a chip. The surface area 32 is the total area represented by the planar face of the IC device 9. The driver areas 34 are the locations of drivers (driver circuitry) disposed on the IC device 9, and the notch areas 36 represent inactive portions of the driver surface area. As such, the notch areas 36 are spaces that do not have an active driver.

The layout tool generates IC layout data from the IC device 9 for use by the integrated thermal analysis system. The IC layout data is then formatted into three distinct sections by the IC layout tool. The three distinct sections include the area representing the IC surface area 32, the various driver areas 34, and the notch areas 36 discussed above. The conversion program reads and parses the input data and generates an input file that is read by the finite element analysis program. The conversion program also copies any necessary macros in data files needed by the finite element analysis program to a working directory predetermined by a user. In one exemplary embodiment, these files include three macros which may be written in the ANSYS programming language known as ANSYS Parametric Design Language (APDL). In addition, the parsing program generates an executable file that controls execution of the finite element analysis program.

The finite element analysis program creates a two-dimensional representation of the surface of the relevant IC device 9 so that each driver and its location can be individually identified. This operation is typically done through a series of Boolean operations and assigning of specific attributes to each of the driver areas.

Figure 3:
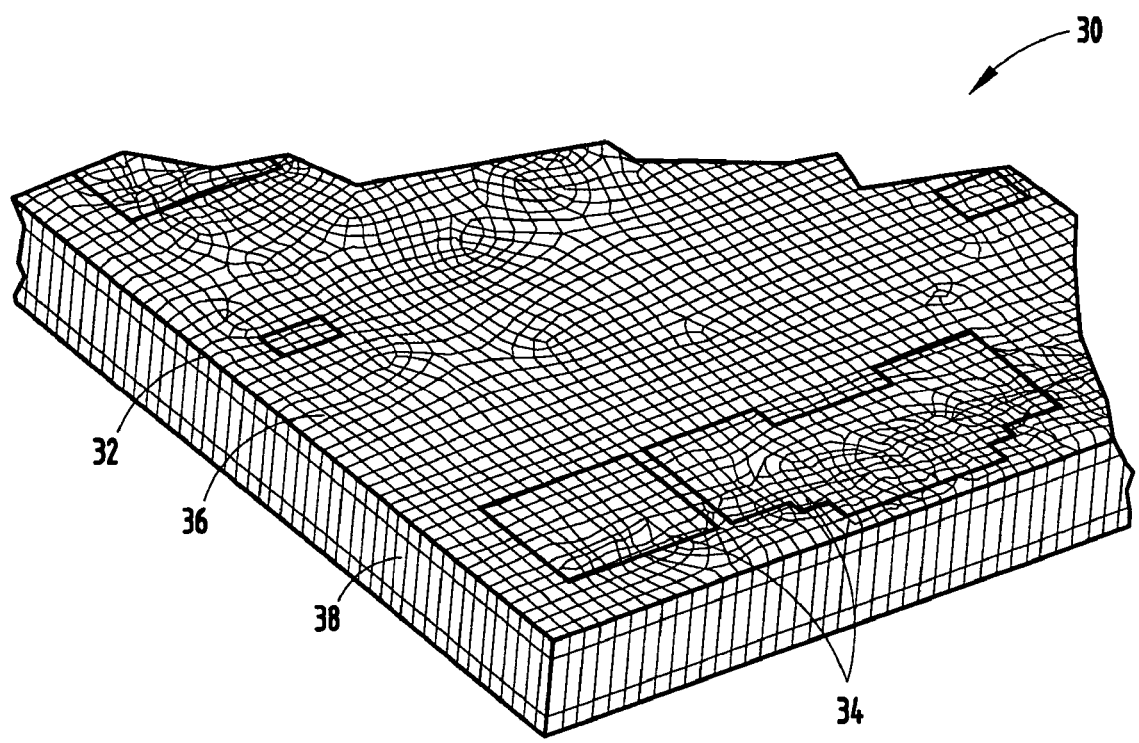
FIG. 3 is an enlarged partial perspective view of a corner of a three dimensional finite element mesh generated from an IC.

FIG. 3 illustrates the IC device die surface after it has been partitioned. The user will typically enter information into the graphical user interface for use in the parsing program. Afterwards, the processed IC layout data is displayed in a separate window. The processed IC layout data should have the three distinct sections representing the area of the IC device surface 32, the various driver areas 34, and the notch areas 36. The finite element analysis program is also instructed to generate a three-dimensional finite element mesh 37 (shown in FIG. 3) by extruding the chip surface area 32 already entered. The three-dimensional finite element mesh 37 of the IC device 9 is automatically generated and indicates the driver locations and the notch area locations.

After the three-dimensional finite element mesh has been extruded, material properties are assigned to the mesh. The graphical user interface will prompt the user to select an input file and a working directory to store the information. The graphical user interface will also prompt the user to enter data necessary to perform a thermal analysis. Specifically, the user may be queried to enter the die thickness, the material that attaches the die to the drivers and the material thickness. A pedestal material may also be entered, as well as the pedestal length, width, and height dimensions and thermal information. Also, underfill information, such as the underfill material and thickness is entered by the user as well as the power dissipation information. The material properties may be assigned automatically based on frequently used previous IC device materials. Specifically, the materials from which an IC device 9 may be constructed (the die attach material, pedestal material and underfill material) will be inputted into the graphical user interface and a user will be prompted to select the appropriate material to be used in the IC device 9 being analyzed.

Figure 4:
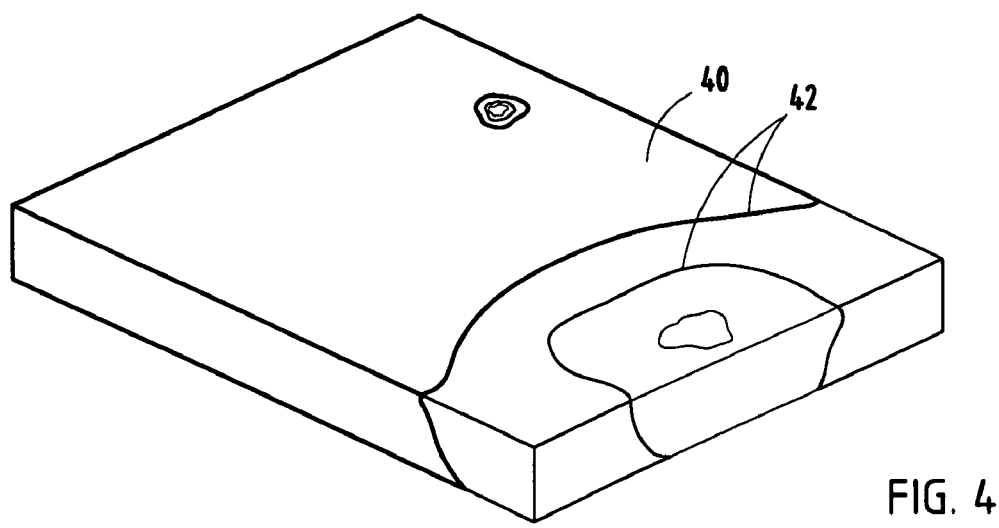
FIG. 4 is a perspective view of a thermal analysis plot derived from thermal analysis of an IC.

After all thermal analysis information has been entered, the user will request by way of the graphical user interface that a thermal analysis be conducted. The analysis is then automatically performed by the FEA program and the thermal analysis data results are stored in a format report. The format report may be stored as a Hypertext Markup Language (HTML) file, according to one embodiment. FIG. 4 illustrates one example of a temperature contour plot 40 that is generated by the FEA program and included in the format report. The temperature contours 42 represent changes in temperature across the IC device surface. The format report may be used to analyze whether the IC device layout has thermal properties that are within acceptable limits. Further, potential IC problems related to thermal stress on the IC device 9 can be analyzed before the IC device 9 is constructed thus minimizing unnecessary manufacturing and testing costs.

Figure 5:
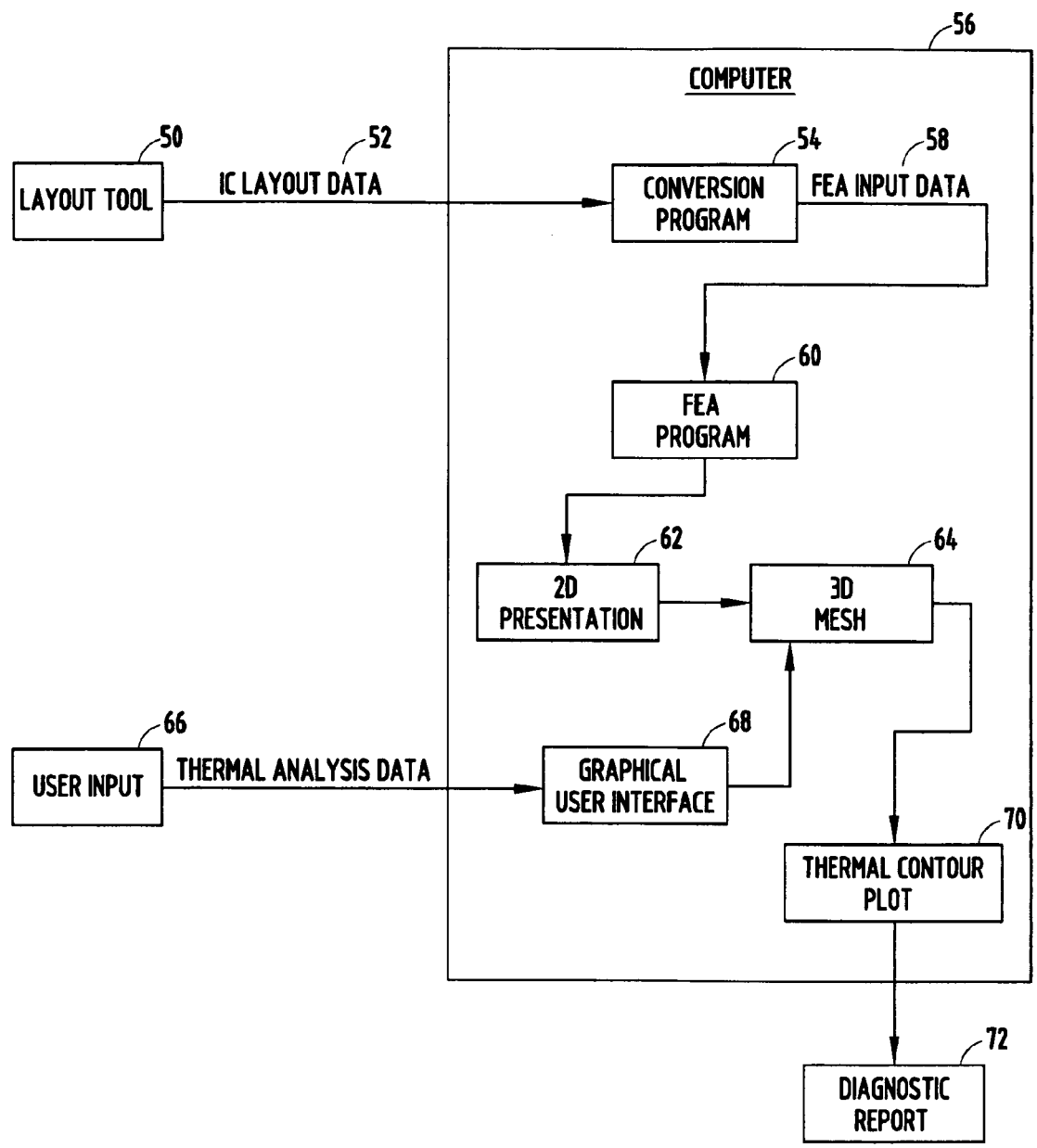
FIG. 5 is a block diagram illustrating an integrated thermal analysis system for generating the thermal analysis.

Referring to FIG. 5, one embodiment of an integrated thermal analysis system for generating the thermal analysis according to the above-described method is provided. The system includes various components for generating the finite element mesh from the IC layout data. The system is shown implanted in a computer 56. The computer 56 generally has microprocessor and memory capabilities for storing and executing data and software programs. The computer 56 may include an off-the-shelf device that is capable of handling the software programs for performing the thermal analysis. Also included in the system is the layout tool 50 which provides IC layout data 52 to a conversion program 54 installed and executed on the computer 56. The layout tool 50 may include IC graph, commercially available from Mentor Graphics Corporation. The conversion program 54 converts the IC layout data 52 into finite element analysis input data 58 for use by a finite element analysis program 60 executed on computer 56. The finite element analysis program 60 then creates a two-dimensional representation 62 of the surface 32 of the IC device 9 so that each driver can be individually identified. Next, a three-dimensional representation 64 is extruded from the surface of the IC device 9 based on the two-dimensional representation. The system is further shown having a user input 66, such as a keyboard, a memory storage device, and/or other user data entry device. Thermal analysis data including material properties is applied via user input 66 to the three-dimensional mesh 64 via a graphical user interface 68. A thermal contour plot 70 is created from the application of the thermal analysis data to the three-dimensional mesh 64. The thermal contour plot 70 may be used to prepare a diagnostic report 72 that a manufacturer can review in deciding whether to commence with production of the IC device 9.

Accordingly, the method and system of performing a thermal analysis of an IC device 9 and generating data in a report allows for automated generation of thermal data with minimal user intervention. This allows IC device 9 manufacturers to analyze the thermal properties of IC devices 9 without having to actually construct the IC device 9, thus minimizing manufacturing time and costs. Further, the likelihood of human error is minimized and the method of conducting the finite element analysis is completed in relatively minimal time.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A method of performing a thermal analysis of an integrated circuit device, comprising the steps of:
   reading and parsing layout data from the integrated circuit device;
   directing a conversion program to input instructions for a finite element analysis program to generate predetermined thermal source areas based on the integrated circuit device layout data;
   directing the conversion program to input instructions for the finite element analysis program to partition the integrated circuit device to define thermal source areas that designate drivers;
   directing the conversion program to input instructions for the finite element analysis program to generate a finite element mesh of the integrated circuit device;
   collecting information about operating conditions from a user;
   directing the conversion program to input instructions for the finite element analysis program to perform a thermal analysis of specific thermal sources that designate drivers of the integrated circuit device based on the information collected about operating conditions;
   executing the analysis program; and
   producing thermal analysis data via execution of the analysis program based on the operating conditions supplied by the user.

2. The method of claim 1, wherein the step of collecting information about operating conditions from a user further includes:
   assigning an amount of heat expected to be dissipated when a predetermined driver is active.

3. The method of claim 1, further comprising the step of:
   constructing a two-dimensional representation of the integrated circuit device surface area.

4. The method of claim 3, further comprising the step of:
   generating a three-dimensional finite element mesh by extruding the integrated circuit device surface area.

5. The method of claim 4, further comprising the step of:
   inputting thickness of the integrated circuit device, material from which the integrated circuit device is constructed, and material from which an underfill is constructed.

6. The method of claim 5, further comprising the step of:
   generating a thermal contour plot from the thermal data entered for each driver.

7. The method of claim 6, further comprising the step of:
   storing the thermal contour plot in a report format.

8. A method for generating a thermal analysis, comprising the steps of:
   determining size and placement of each of a plurality of drivers on an integrated circuit device;
   storing the determined size and placement of each driver as layout data;
   converting the layout data into input for a finite element analysis program;
   applying the input to the finite element analysis program;
   using the finite element analysis program to construct a finite element mesh of the integrated circuit device from the input;
   assigning material properties to the finite element mesh; and
   performing a thermal analysis of the finite element mesh.

9. The method of claim 8, further comprising the step of:
   defining an integrated circuit device surface area and determining the integrated circuit device material.

10. The method of claim 9, further comprising the step of:
    defining driver areas on the integrated circuit device and entering the amount of heat that will dissipate in each of the plurality of drivers.

11. The method of claim 9, further comprising the step of:
    constructing a two-dimensional representation of the integrated circuit device surface area.

12. The method of claim 11, wherein the step of constructing a finite element mesh of the integrated circuit device from the layout data further comprises:
    generating a three-dimensional finite element mesh by extruding the integrated circuit device surface area.

13. The method of claim 8, further comprising the step of:
    generating a thermal contour plot.

14. The method of claim 13, further comprising the step of:
    storing the thermal contour plot in a report format.

15. The method of claim 14, further comprising the step of:
    defining notch areas on the integrated circuit device.

16. The method of claim 15, further comprising the step of:
    defining driver areas on the integrated circuit device.

17. An integrated thermal analysis system comprising:
    a layout tool that generates integrated circuit layout data relating to driver areas and notch areas on an integrated circuit device;

a conversion program that converts the integrated circuit layout data into finite element analysis input data;

a finite element analysis program that creates a two-dimensional representation of a surface area of the integrated circuit device and further creates a three-dimensional finite element mesh from the surface area;

a graphical user interface that accepts thermal analysis data entered by a user, wherein the thermal analysis data is assigned to the three-dimensional finite element mesh.

18. The integrated thermal analysis system of claim 17, further comprising:

a thermal contour plot that is derived from the three-dimensional finite element mesh.

19. The integrated thermal analysis system of claim 18, further comprising:

a diagnostic report developed from the thermal contour plot.

* * * * *